United States Patent
McKinnon

[11] Patent Number: 5,827,425
[45] Date of Patent: Oct. 27, 1998

[54] GREASE RECOVERY SYSTEM AND METHODS

[76] Inventor: Nick McKinnon, PO Box 747, Rockland, Mass. 02370

[21] Appl. No.: 635,664

[22] Filed: Apr. 22, 1996

Related U.S. Application Data

[60] Provisional application No. 60/009,020 Dec. 21, 1995.
[51] Int. Cl.⁶ .................................................. C02F 1/40
[52] U.S. Cl. ........................ 210/194; 210/305; 210/307; 210/521; 210/540
[58] Field of Search .................... 210/170, 242.3, 210/242.4, 259, 305, 307, 455, 470, 473, 477, 521, 523, 526, 540, 194

[56] References Cited

U.S. PATENT DOCUMENTS

| | | | |
|---|---|---|---|
| 367,457 | 9/1887 | Levett | 210/471 |
| 902,038 | 10/1908 | Wood | 210/470 |
| 3,447,683 | 6/1969 | Luce, Jr. | 210/540 |
| 4,089,784 | 5/1978 | Ettelt et al. | 210/526 |
| 4,113,617 | 9/1978 | Bereskin et al. | 210/521 |
| 4,235,726 | 11/1980 | Shimko | 210/523 |
| 4,400,279 | 8/1983 | Protos | 210/521 |
| 4,652,372 | 3/1987 | Threadgill | 210/526 |
| 5,122,280 | 6/1992 | Russell et al. | 210/538 |
| 5,178,752 | 1/1993 | McKinnon | 210/474 |
| 5,360,555 | 11/1994 | Batten | 210/540 |
| 5,500,132 | 3/1996 | Elmi | 210/521 |

*Primary Examiner*—Christopher Upton
*Attorney, Agent, or Firm*—Curtis A. Vock

[57] ABSTRACT

A grease recovery system includes a basin with an inlet port to connect the system to a waste disposal network, e.g., a sink in a restaurant, and to an outlet port for draining substantially grease-free water into a sewer network. A grease outlet port provides for recovering grease from the system. The basin holds waste water to a level corresponding to the height of the outlet port above a floor of the basin. The inlet port is above that level so that incoming waste water drains into the basin. An inlet baffle is arranged within the basin and adjacent to the inlet port to force waste water entering the inlet port downwards toward the floor. A first blocking baffle, mounted to the floor, reduces waste water flow along the floor after the waste water passes through the inlet baffle, so that grease rises to the water level downstream of the inlet baffle. A motorized belt sub-system is mounted within the basin to rotate a belt which attracts grease to the belt's surface and along the water level. The grease on the surface is forced toward the belt by a transport system such as a blower or paddle. The belt thereafter flexibly lifts the grease upwards above the water level during rotation. The belt scrapes against a catch troth connected to the grease outlet port where the grease can be recovered for recycling. Water can be recycled back into the inlet baffle to provide enhanced cleaning and gray water.

18 Claims, 10 Drawing Sheets

| L | W | H | $C_{L_I}$ | $C_{L_O}$ | INLET (IPS) | OUTLET (IPS) |
|---|---|---|---|---|---|---|
| 14" | 14" | 16.5" | 11.5" | 10.5" | 2" | 2" |
| 14" | 14" | 16.5" | 11.5" | 10.5" | 3" | 3" |
| 14" | 14" | 16.5" | 11.5" | 10.5" | 4" | 4" |

*Fig. 2C*

| L | W | H | $C_{L_I}$ | $C_{L_O}$ | INLET (IPS) | OUTLET (IPS) | X - OVERALL LENGTH | Y - OVERALL WIDTH | Z - OVERALL HEIGHT |
|---|---|---|---|---|---|---|---|---|---|
| 24" | 24" | 30" | 26" | 25" | 4" | 4" | 27" | 24" | 36" |
| 24" | 24" | 30" | 51" | 50" | 4" | 4" | 27" | 24" | 59.5" |
| 24" | 24" | 30" | 51" | 50" | 5" | 5" | 27" | 24" | 59.5" |
| 24" | 24" | 30" | 51" | 50" | 6" | 6" | 27" | 24" | 59.5" |

GREASE RECOVERY SYSTEM AND METHODS

RELATED APPLICATIONS

This is a continuing application of Provisional Application No. 60/009,020, filed on Dec. 21, 1995, entitled "Grease Recovery System and Methods," and is hereby incorporated by reference.

BACKGROUND

Waste disposal continues to be a growing concern for the 1990s. By way of example, industries which perform dumping within the septic system are continually subjected to new and stringent waste-water guidelines and local by-laws. These guidelines and by-laws are made in view of the public good; yet they are also burdensome on the nation's industries. It is expected that such guidelines will continue to restrict dumping and/or to require cleansing of waste water well into the next century.

Currently, there are few, if any, effective methods of cleaning or purifying waste-water prior to dumping. Waste water containing small solid particulates, certain dissolvents, and mixtures of grease and oil are particularly difficult to clean inexpensively and effectively. Typical cleaning processes which generate "gray water," a term commonly used for cleaned waste water, are thus complex, expensive, and particularly unwieldy in smaller industrial environments such as restaurants.

It is, accordingly, an object of the invention to provide systems and methods which reduce some of the aforementioned difficulties.

Still another object of the invention is to provide a system to efficiently recover grease from waste water.

Yet another object of the invention is to provide systems and methods for producing gray water from waste water containing grease, oil and other petroleum products and by-products.

These and other objects will become apparent in the description which follows.

SUMMARY OF THE INVENTION

In one aspect, the invention provides a system for recovering grease from waste water. The system includes a basin with an inlet port to connect the system to a waste disposal network, e.g., a sink for dumping, and to an outlet port for draining substantially grease-free water into a sewer network. A grease outlet port provides for recovering and/or recycling grease from the system. The basin holds waste water to a level corresponding to height of the outlet port above a floor of the basin. The inlet port is above that level so that incoming waste water drains into the basin. An inlet baffle is arranged within the basin and adjacent to the inlet port to force waste water entering the inlet port downwards toward the floor. A first blocking baffle, mounted to the floor, reduces waste water flow along the floor after the waste water passes through the inlet baffle so that grease rises to the water level downstream of the inlet baffle.

A motorized belt sub-system is mounted within the basin to rotate a belt which attracts grease to the belt's surface and along the water level. Preferably, the belt is flexible and lifts the grease upwards above the water level during rotation. The belt scrapes against a transport sub-system, connected to the basin above the water level, that has a catch troth connected to the grease outlet port.

In another aspect, the system of the invention includes a strainer for separating solid waste from the waste water. Such a strainer preferably includes a strainer mesh with a plurality of holes to pass water and grease therethrough and to substantially prohibit solid waste from passing into the inlet port. The mesh can be formed into a box and connected to a handle to facilitate easy access and removal of the box to remove solid waste from the mesh.

In one aspect, the strainer includes an outer casing and an inner strainer box. The outer casing has an inlet port, for connecting the system to the waste disposal network, and an outlet port for passing waste water to the inlet port of a grease collection sub-system.

In yet another aspect, a sanitary tee within the basin is constructed and arranged adjacent to the outlet port. The sanitary tee forms a conduit for waste water from the basin floor to the outlet port. The tee thereby blocks water-level waste water from the outlet port, and communicates floor-level waste water out of the outlet port.

In still another aspect, a second blocking baffle is mounted to the floor to reduce waste water flow along the floor before the waste water passes through the tee inlet.

Preferably, the system of the invention includes a feedback sub-system with a pump and fluid conduits, e.g., piping or hosing, to collect waste water adjacent to the second blocking baffle and to communicate the collected waste water back to the inlet port. In this way, waste water is recycled between the outlet port and inlet port to enhance cleaning of the waste water.

U.S. Pat. No. 5,178,752 provides useful background for the invention, and is accordingly incorporated herein by reference.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
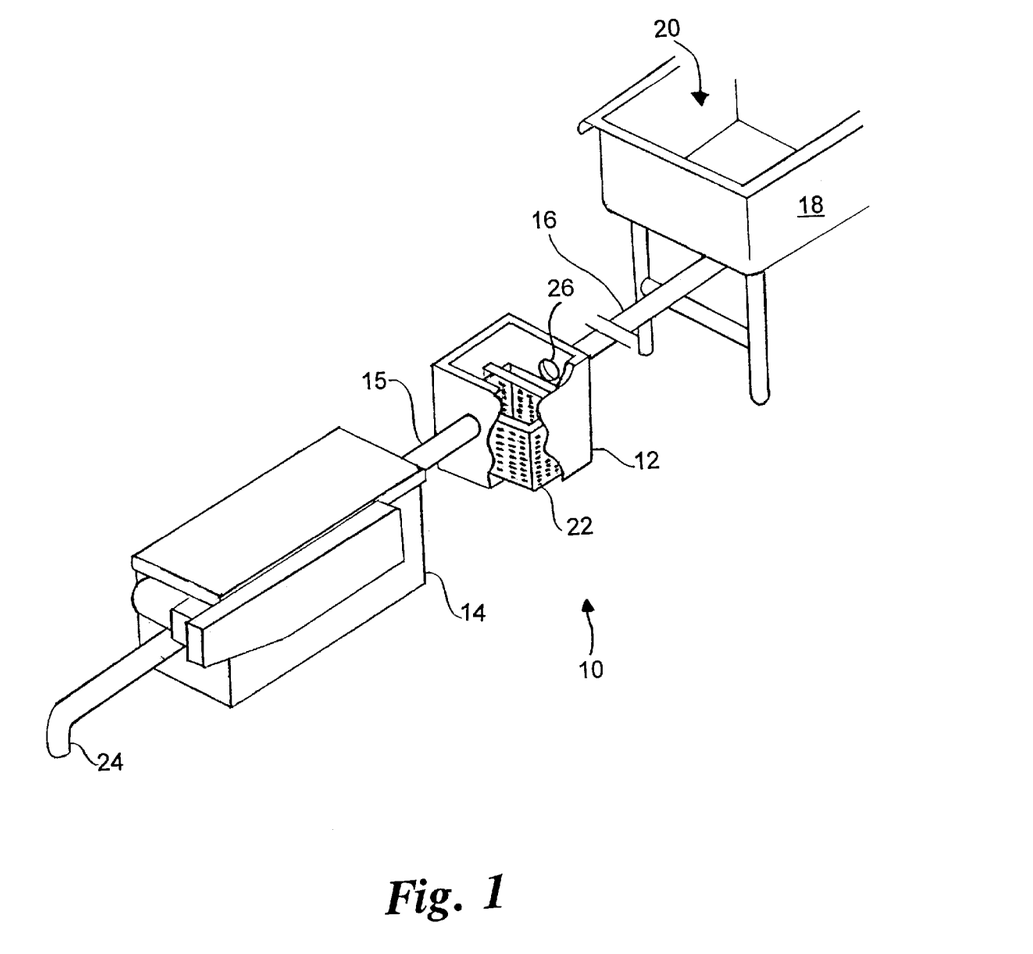
FIG. 1 illustrates a perspective view of a grease recovery system constructed according to the invention.

FIG. 1 illustrates a perspective view of a grease recovery system 10 constructed according to the invention. Specifically, system 10 includes a strainer box 12 and a grease collection sub-system 14, and typically connects via plumbing 16 to a waste disposal network 18, here shown as a sink with a waste water basin 20. Described in more detail below, the strainer sub-system 12 (here shown in a cutaway perspective view) intercepts solid particulates such as paper items that pass from the network 18 and through the plumbing 16 so that such particulates do not reach the grease collection sub-system 14. The strainer sub-system 12 includes a strainer mesh 22 which acts to collect the solid particulates, and which conveniently forms a box that can be removed for easy cleaning of the mesh 22 and removal of the particulates.

The sub-system 14 intercepts, traps and removes grease that is mixed with the waste water dumped into the network 18. It functions to automatically remove the grease from the waste water and to provide for exit of the resulting gray water from an outlet port 24. This gray water is substantially free of grease and typically exits directly into the local sewer system. The grease which is captured by the sub-system 14 is collected within a container (the process and container are described in more detail below) for appropriate recycling.

Figure 2:
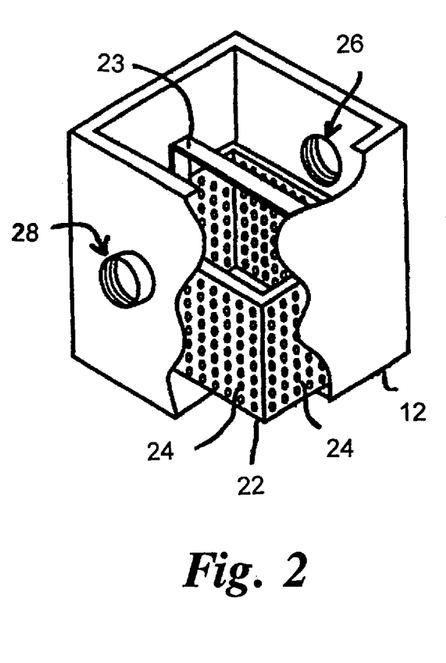
FIG. 2 illustrates a perspective view of one strainer sub-system constructed in accord with the invention.
Figure 2A:
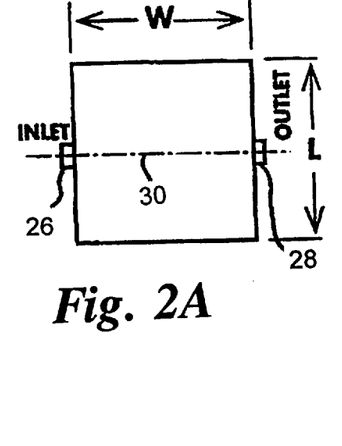
FIGS. 2A and 2B show, respectively, top and side views of the strainer sub-system of FIG. 2.
Figure 2B:
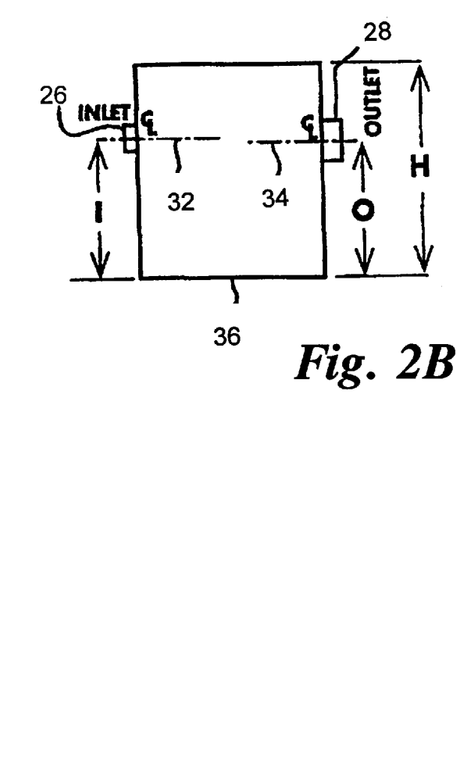
Figure 2C:
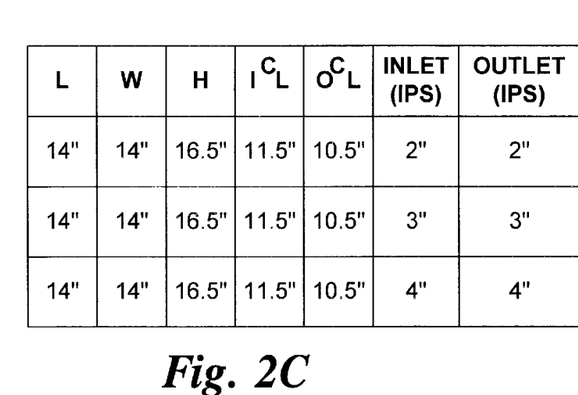
FIG. 2C shows various dimensional configurations of the strainer sub-system of FIG. 2.

FIGS. 2–2C illustrate further detail of the strainer sub-system 12 of FIG. 1. FIG. 2 shows a perspective view; while FIGS. 2A and 2B illustrate top and side views, respectively. As discussed above, the strainer sub-system 12 includes a strainer mesh 22 that forms a removable basket so that waste particulates captured within the mesh 22 are easily removed for solid-waste disposal. A handle 23 facilitates the removal and replacement of the mesh basket 22.

The mesh 22 has a plurality of holes 24 which are arranged and sized so as to capture the expected particulate within the basket 22. Waste water which enters into the sub-system 12 through the strainer inlet port 26 drops via gravity into the mesh basket 22 so that particulates are captured therein. Thereafter, waste water which is substantially free of solid particulates larger than the diameter of the holes 24 flows through the mesh 22 and out of the strainer outlet port 28. In a preferred embodiment, the strainer outlet port 28 leads directly to the grease collection sub-system 14 of FIG. 1.

FIG. 2A shows a top view of the sub-system 12 of FIG. 2. Specifically, FIG. 2A shows a typical width "W" and length "L" corresponding to the linear dimensions of the sub-system 12. Examples of suitable dimensions of "W" and "L" are shown in FIG. 2C. With further regard for FIG. 2A, the ports 26 and 28 preferably have a common center line 30 so that water flows efficiently between the two port 26, 28.

FIG. 2B illustrates a side view of the strainer sub-system 12. In contrast to the common center line 30 of FIG. 2A, the center lines 32 and 34 of the port 26 and 28, respectively, are different so that gravity and settling waste water combine to provide efficient collection of solid waste matter, i.e., particulates. As shown, the distance between the base 36 of the strainer sub-system 12 and the center line 32 of the strainer inlet port 26 is shown as typical height "I"; while the distance between the base 36 and the center line 34 of the strainer outlet port 28 is shown as typical height "O." Examples of suitable dimensions of "I" and "O" relative to the center lines are shown in FIG. 2C.

Figure 3:
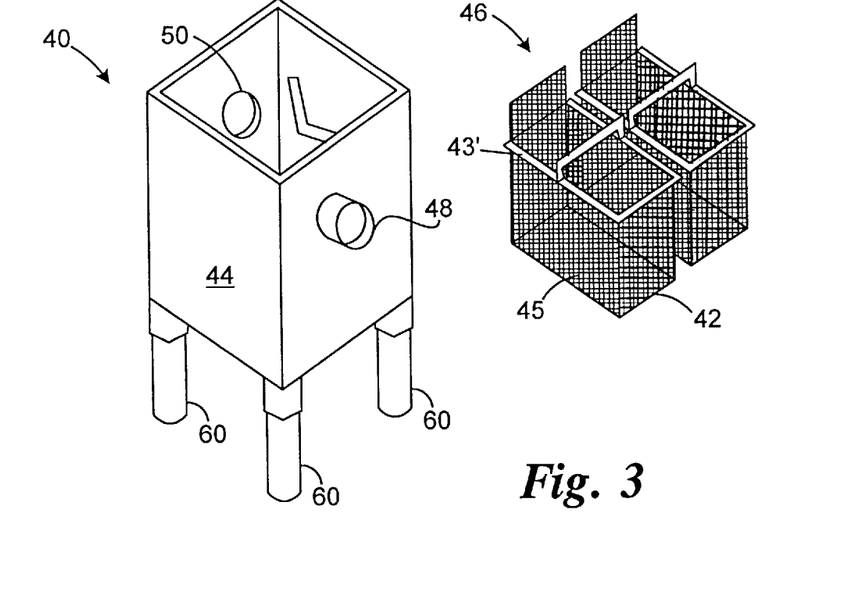
FIG. 3 illustrates another perspective view of a strainer sub-system constructed in accord with the invention.
Figure 3A:
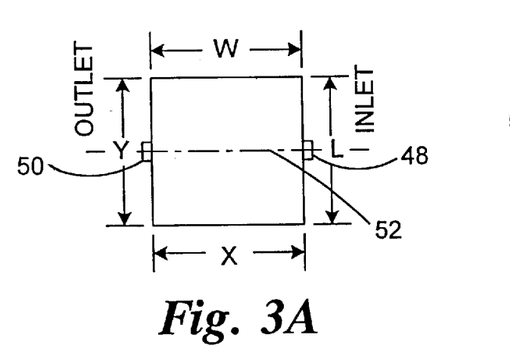
FIGS. 3A and 3B show, respectively, top and side views of the strainer sub-system of FIG. 3.
Figure 3B:
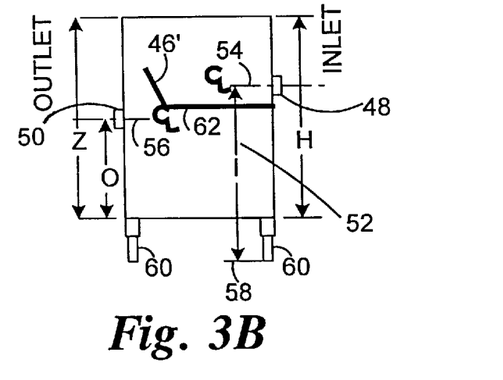
Figure 3C:
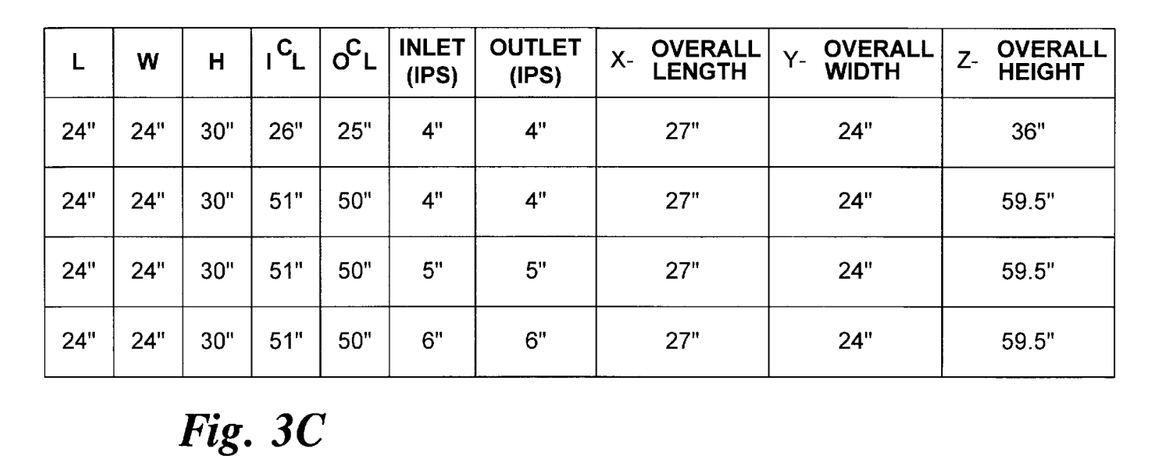
FIG. 3C shows various dimensional configurations of the strainer sub-system of FIG. 3.

FIGS. 3–3C illustrate another embodiment of a strainer sub-system 40, similar to the strainer sub-system 12 of FIG. 1. FIG. 3 shows a perspective view of the sub-system 40; while FIGS. 3A and 3B illustrate top and side views, respectively, of sub-system 40. Like above, the strainer sub-system 40 includes a strainer mesh 42 that forms a basket shape so that waste particulates captured within the mesh 42 are easily removed for solid-waste disposal via the handle 43. For clarity of illustration, the strainer mesh 42 is shown here outside of the container 44 to illustrate that this embodiment includes a back mesh portion 46 which provides more effective straining out of the container 44 as compared to the mesh 22 of FIG. 2. Specifically, waste water which enters through the strainer inlet port 48 drops via gravity into the mesh basket 42 so that particulates are captured therein. Thereafter, waste water which is substantially free of solid particulates larger than the diameter of the holes 45 flows through the mesh 42 and out of the strainer outlet port 50. High speed or overflowing water passes through the back mesh 46 to capture residual particulates. In a preferred embodiment of the invention, the strainer outlet port 50 leads directly to the grease collection sub-system such as illustrated as sub-system 14 of FIG. 1.

FIG. 3A shows a top view of the sub-system 40 of FIG. 3. Specifically, FIG. 3A shows a typical width "W," length "L," and "X" (representing the outer dimensions between inlet and outlet ports 48 and 50) each of which corresponds to the linear dimensions of the sub-system 40. Examples of suitable dimensions of "W," "L" and "X" are shown in FIG. 3C. With further regard for FIG. 3A, the ports 48 and 50 preferably have a common center line 52 so that water flows efficiently between the two port 48,50.

FIG. 3B illustrates a side view of the strainer sub-system 40. In contrast to the common center line 52 of FIG. 3A, the center lines 54 and 56 of the port 48 and 50, respectively, are different so that gravity and settling waste water combine to provide efficient collection of solid waste matter, i.e., particulates, within the mesh 42. As shown, the distance between the base 58 of the strainer sub-system 40 and the center line 54 of the strainer inlet port 48 is shown as typical height "I"; while the distance between the base 58 and the center line 56 of the strainer outlet port 50 is shown as typical height "O." The overall height of the strainer sub-system 40 is shown as typical height "Z," while the height of the sub-system 40 minus the height of the legs 60 is shown as typical height "H." Examples of suitable dimensions of "I," "O," "H" and "Z" are shown in FIG. 3C.

FIG. 3B additionally shows an outline 62 of the top of the strainer mesh 42, including the back portion 46', thereby illustrating the preferred placement of the mesh 42 within the container 44 and relative to the center lines 54, 56. As shown, the back portion 46' acts to "block" waste water which exits the port 48 with sufficient force to move directly towards the outlet port 50.

Figure 4:
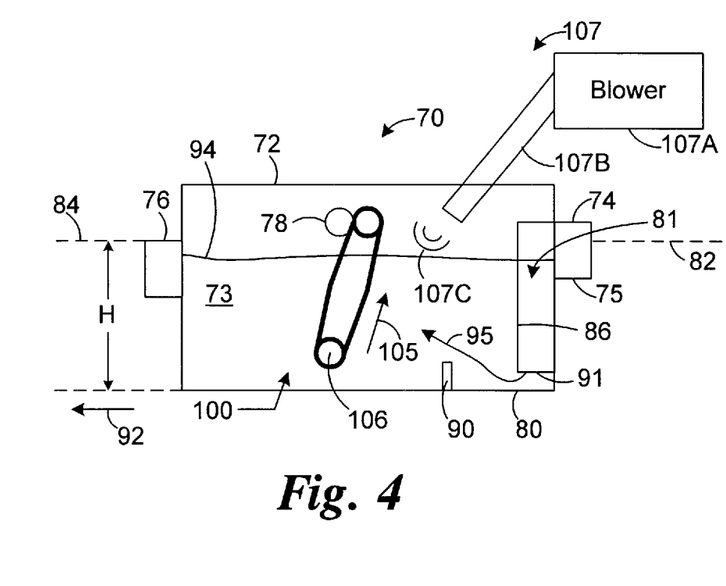
FIG. 4 illustrates a side view of a grease collection sub-system constructed according to the invention.

FIG. 4 illustrates a side view of a grease collection sub-system 70 constructed according to the invention. A basin 72 (here shown transparently for clarity of illustration) has a first inlet port 74 to connect the sub-system to the waste disposal network, such as the waste water disposal sink 18 of FIG. 1. A first outlet port 76 acts to draining substantially grease-free water, i.e., "gray water," from the sub system 70 and into the local sewer network. Grease collected within the basin 72 exits out of the grease outlet port 78 so that collected grease can be recycled.

The basin 72 holds waste water 73 to a level corresponding to a height "H" above the floor 80 of the basin 72. More specifically, the distance between the center line 82 of the inlet port 74 and the floor 80 is larger than the dimension "H" (the distance between the floor 80 and the center line 84 of the outlet port) so that water entering the port 74 is drained and captured within the basin 72 and maintained at a height "H" therein before exiting through the outlet port 76. In a preferred embodiment, the distance between the bottom 75 of the inlet port 74 to the water line at height "H" is about one half inch. As above, the inlet port 74 preferably connects to the strainer sub-system, such as the sub-system 12 of FIGS. 1 and 2, via appropriate plumbing, such as the pipe 15 of FIG. 1.

Figure 4A:
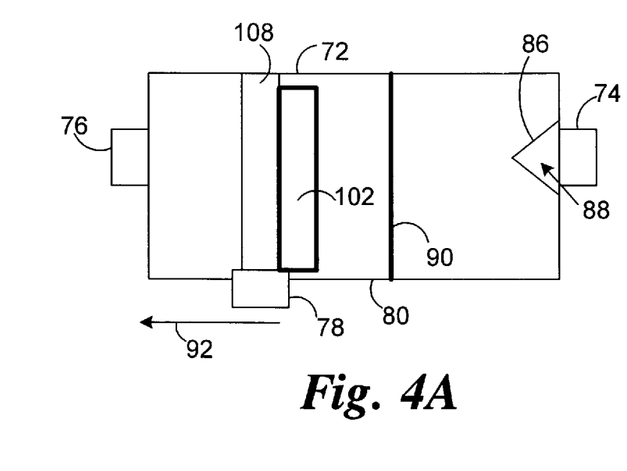
FIG. 4A shows a top view of the sub-system of FIG. 4.

An inlet baffle 86 (also shown transparently for ease of illustration) is constructed and arranged within the basin 72 and adjacent to the inlet port 74 so as to force waste water entering the inlet port 74 downwards and toward the floor 80, such as shown by waste water path 81. FIG. 4A illustrates in a top view that the baffle 86 preferably forms a triangular shape such that waste water entering the inlet port 74 is collected by the inner portion 88 of the triangular baffle 86.

A first blocking baffle 90 is mounted to the floor 80 of the basin 72 to inhibit waste water flow along the floor 80 in the direction of arrow 92 after the waste water passes through the inlet port 74 and downwards through the triangular-shaped inlet baffle 86. Grease exiting from the bottom 91 of the baffle 86 first flows in direction 92 and thereafter bounces off the baffle 90 so as to rise upwards towards the water surface 94, such as illustrated by path 95. Because grease tends to rise to the top of the water 73 at a rate of about one inch per second, any grease captured within the basin 72 rises to the water level "H" downstream of the inlet baffle 86.

A belt rotation sub-system 100 is also connected to the basin 72 (and to an electric motor, shown in FIG. 4B, so as to power the belt sub-system 100) and includes a flexible belt 102 and rollers 104, 106. Preferably, the belt 102 is constructed of hard plastic interlocking components, commonly known as "solid lock plastic" by those skilled in the art. Various commercially available designs of lock plastic can be used, in accord with the invention, to modify the collection efficiency of the invention relative to a particular type or consistency of grease. One suitable manufacturer of this commercially available belting is Sparks Belting Company of Grand Rapids, Mich.

In operation, the belt 102 is rotated about the two rollers 104, 106 in a direction 105 so as to attract and collect grease onto the lock plastic and to lift grease upwards and above the water line 94. The belt 102 is scraped against a catch trough 108 (shown in FIGS. 4A and 4B), connected to the grease outlet 78, so that grease is removed from the belt 102 during rotation. In one preferred embodiment, the rollers 104 and 106 have different diameters of two and three inches, respectively.

In a preferred embodiment of the invention, the grease recovery system of the invention includes a blower sub-system 107, as illustrated in free space (for clarity) above the basin 72, connected to pressure conduit 107B, e.g., a hose. In accord with the invention, the blower source 107A, e.g., a compressor of conventional design, can be positioned anywhere so long as it provides pressure along conduit 107B to focus blowing air 107C onto the water surface 94. In operation, the blower source 107A is turned on so that air 107C is forced onto the surface 94 and in the general direction of arrow 92, FIGS. 4A, 4B. In this way, grease which rises upwards, such as illustrated by grease path 95, and which reaches the surface 94 is blown towards the belt 102 to more efficiently collect grease thereon.

Figure 4B:
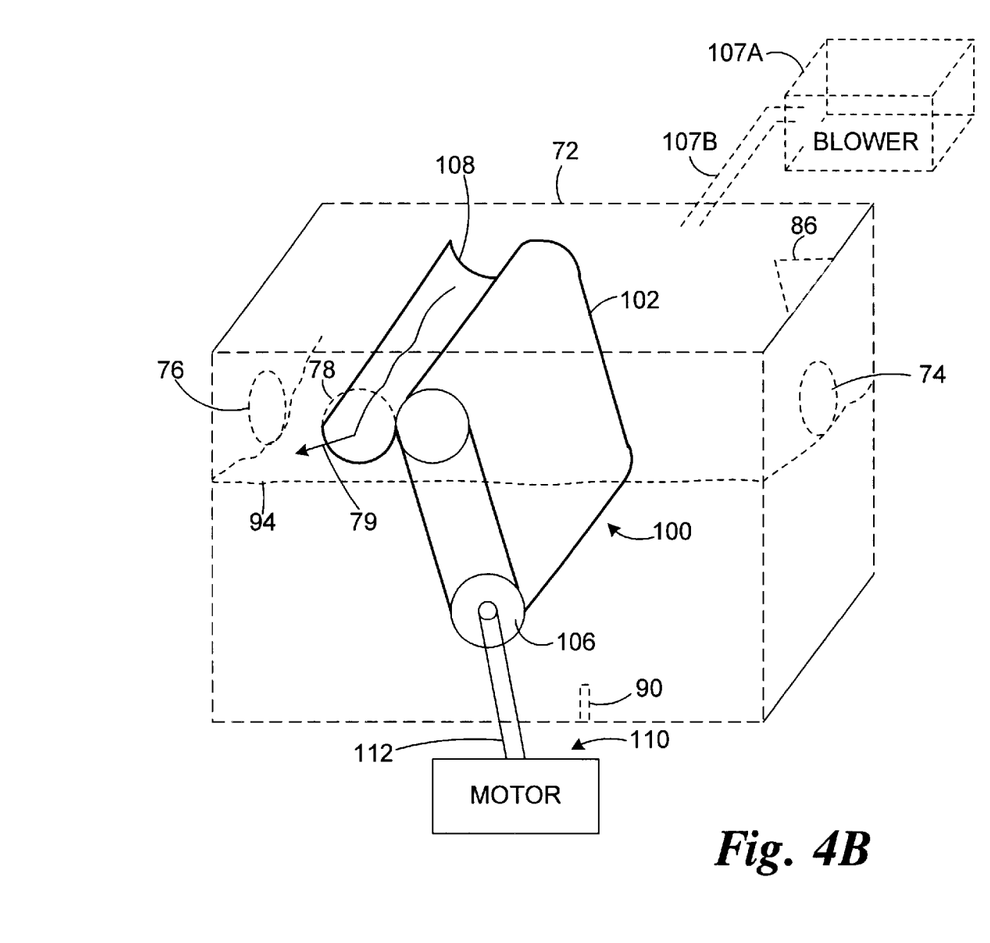
FIG. 4B illustrates specific detail of a catch trough, constructed according to the invention, for scraping grease from the rotating belt of the grease collection sub-system.

FIG. 4B shows a perspective view (not to scale) of part of the sub-system 70 of FIG. 4 to better illustrate the catch trough 108 and belt sub-system 100. Note, for clarity of illustration, that the belt sub-system 100 is tilted in a different direction as compared to FIG. 4, and that several of the elements discussed above, such as the basin 72, ports 74, 76, 78, and blower sub-system 107 are shown as dotted outlines. The catch trough 108 of FIG. 4B connects directly to the grease outlet port 78 of the basin 72 so that grease scraped from the belt 102 flows within the trough 108 and out of the port 78 for recycling. Accordingly, the trough 108 is tilted slightly so that grease within the trough 108 flows towards and out of the port 78, such as shown by grease path 79.

FIG. 4B also illustrates one exemplary motor drive sub-system 110 such as known to those skilled in the art. The motor drive sub-system 110 drives the rotation of the belt 102 about the rollers 104, 106 through a drive connection 112 such as a belt or gearing mechanism.

The water line 94 of FIG. 4B illustrates an approximate relationship between the position of the ports 74, 76 and 78. As shown, waste water entering the basin 72 through the port 74 drops via gravity into the triangular inlet baffle 86. Gray water exits through the outlet port 76 after being cycled by the belt sub-system 100 and blower sub-system 107 so that grease is scraped into the trough 108.

Figure 4C:
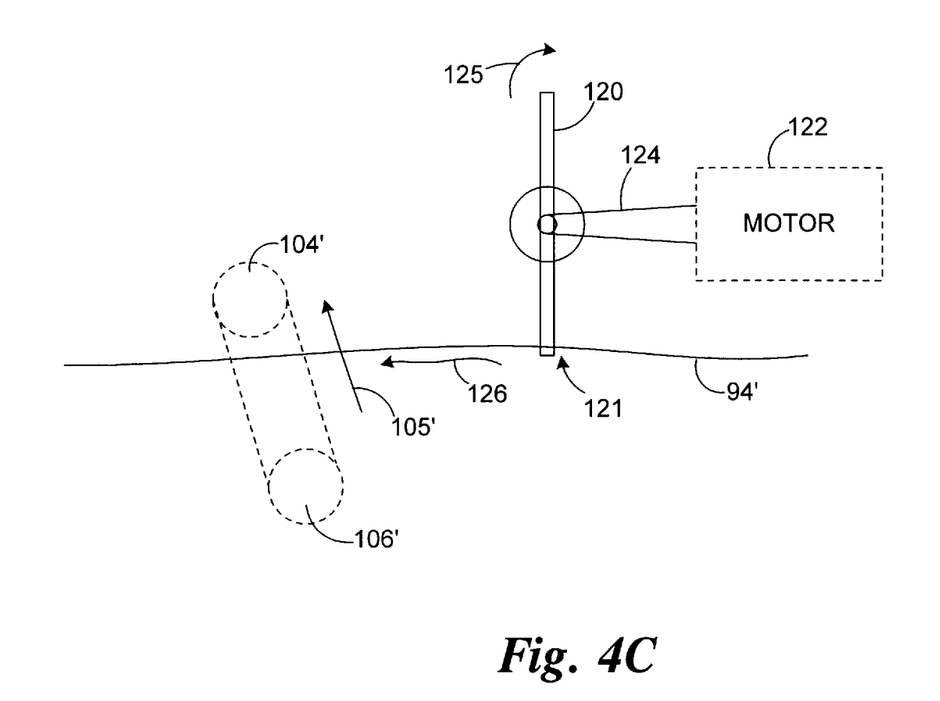
FIG. 4C illustrates an alternative grease transport sub-system including a rotating paddle for pushing grease along the water level and in a direction between the inlet port and the outlet port of the grease collection sub-system.

In an alternative embodiment, the blower sub-system 107 can be replaced by a rotating paddle 120 arranged within the basin 72 so as to rotate and dip below the water level 94' to a dimension 121 of no more than about one half inch, such as shown in the side view of FIG. 4C. For clarity of illustration, most of the elements described above are not included within FIG. 4C; and some elements discussed above, such as the belt 102', are shown in dotted outline. Briefly, the paddle 120 of FIG. 4C is connected to a motor drive 122 via a drive connection 124 so that the paddle 120 is rotated about direction 125 to "push" the grease towards the belt 102', in a general direction from the inlet port 74 to the outlet port 76, such as shown by grease path 126. If the paddle dips below the dimension 121 of one half inch, unwanted bubbles can be created; so careful adjustment of the paddle rotation is desirable.

Figure 4D:
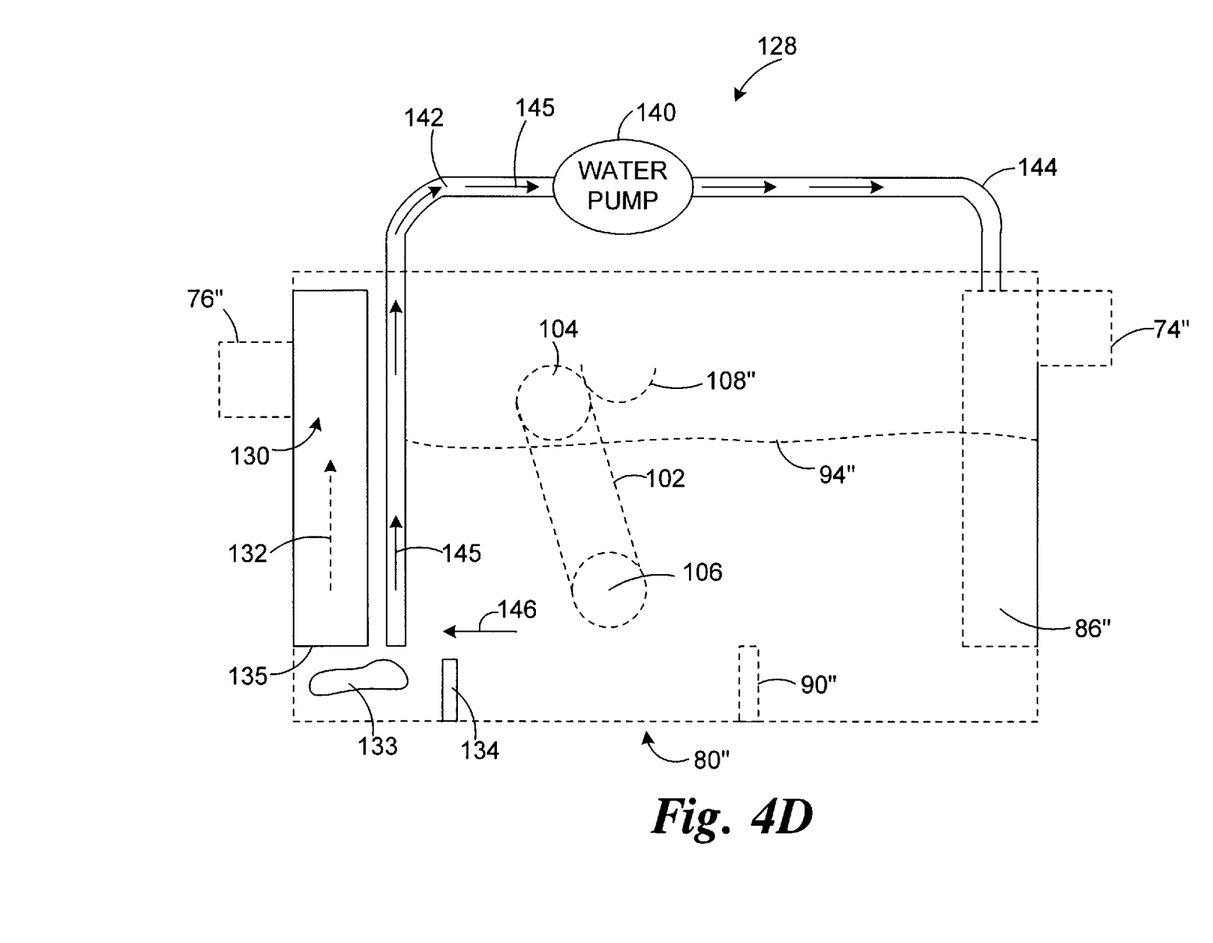
FIG. 4D shows a side view of another embodiment of a grease collection sub-system constructed according to the invention and including a sanitary tee and a pump sub-system to recycle water within the basin.

FIG. 4D shows a side view of a preferred embodiment of a grease collection sub-system 128 constructed according to the invention. Note, for clarity of illustration, that several of the elements discussed above are not shown and that some elements such as the belt 102", water line 94", rollers 104", 106", basin 72", ports 74", 76", and inlet baffle 86" are shown as dotted outlines. A sanitary tee 130 within the basin 72" and adjacent to the outlet port 76" forms a conduit 132 for waste water from the basin floor 80" to the outlet port 76". The tee 130 functions to inhibit the exiting of waste water out of port 76" from the water level 94", and to encourage the flow of floor-level waste-water 133 tip the conduit 132 of tee 130 and out the port 76". In this way, upper level waste water which contains more grease tends to be recycled within the sub-system 128. On the other hand, because lower level waste water 133 tends to have less grease content, particularly about the tee inlet 135 of the tee 130, that water is relatively unrestricted for passage out of the sub-system 128 by passage through the conduit 132 and out of the port 76".

In the preferred embodiment of the invention, as shown in FIG. 4D, a second blocking baffle 134 is mounted to the floor 80" so as to inhibit direct movement of waste water grease along the floor in the direction of arrow 146, thereby forcing more grease upwards towards the water surface 94" for recycling.

FIG. 4D also shows a water pump 140 of conventional design which connects to appropriate water conduits 142, 144, e.g., rubber hosing, so that the floor-level waste water 133 near to the tee inlet 135 and/or blocking baffle 134 is recycled back into the inlet baffle 86" along direction 145. In this way, the waste water within the basin 72" is again cleaned to remove more grease prior to exiting as gray water from the port 76". The pump 140 and conduits 142, 144 thus act as a grease feedback sub-system to further purify the waste water within the sub-system 128.

Figure 4E:
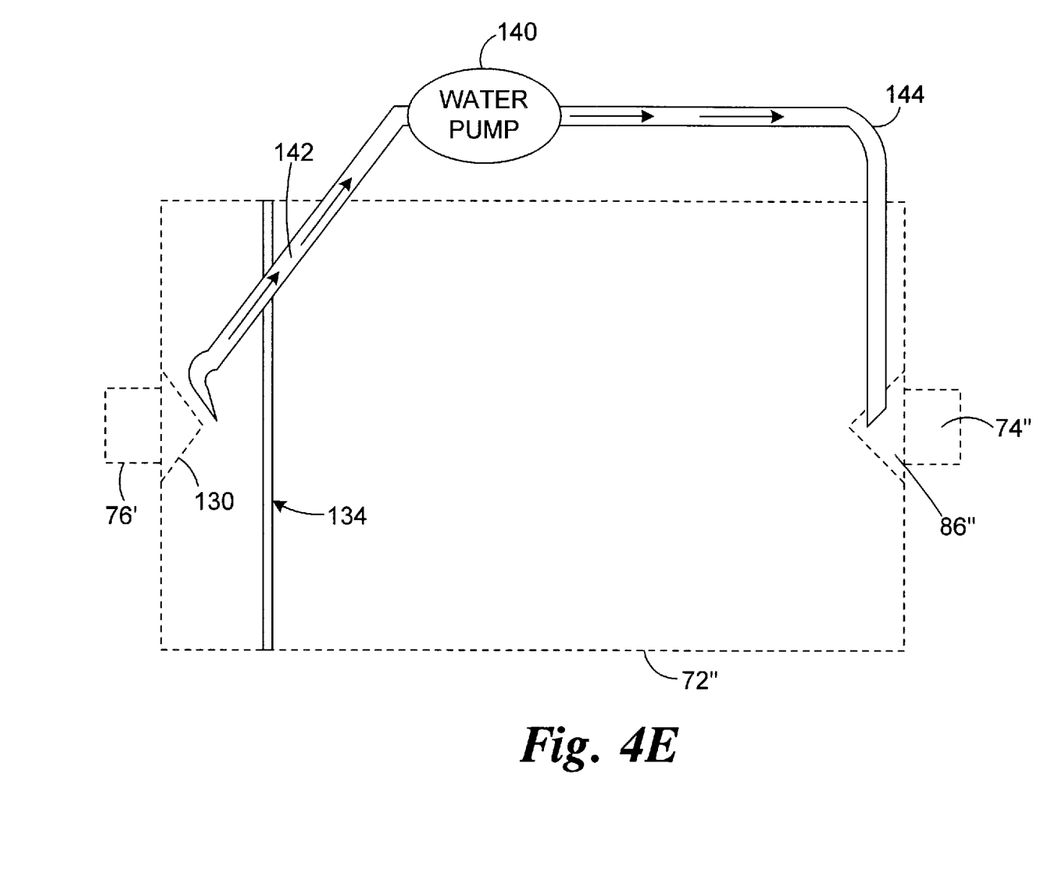
FIG. 4E illustrates a top view of some of the elements illustrated in FIG. 4D.

FIG. 4E shows a top view of the sub-system 128 of FIG. 4D. Specifically, and for clarity of illustration, FIG. 4E shows the outline of some of the above-described elements, such as the basin 72", the inlet baffle 74", the sanitary tee 130, and the inlet and outlet ports 74", 76", respectively. FIG. 4E also shows the pump 140 in connection with its recycling function by pumping water from the basin floor, near to the blocking baffle 134, and to the inlet baffle 86" to mix with newly added water to the sub-system 128.

Preferably, the invention utilizes polished stainless steel type-304 for construction of the elements exposed to waste water, such as the sanitary tee, inlet baffle, blocking baffles, and basin.

Figure 5:
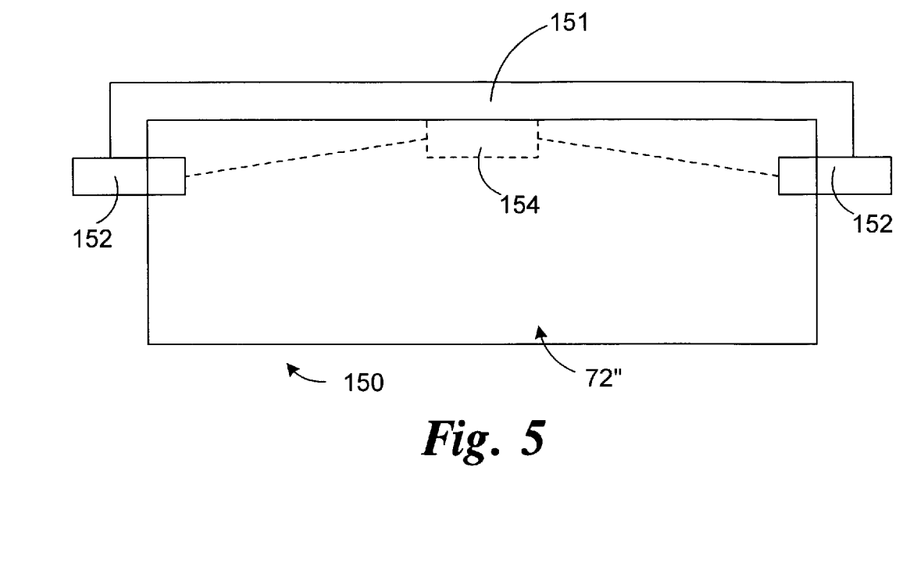
FIG. 5 shows certain safety features preferably incorporated into a system such as shown in FIG. 1.

FIG. 5 illustrates several safety mechanisms which can be incorporated into the grease recovery system. Specifically, FIG. 5 shows the outline of a grease collection subsystem 150 constructed such as in the sub-system 70 of FIG. 4. A top stainless steel cover 151 latches onto the grease recovery subsystem 150 via latches 152 so that individuals are kept from the rotating mechanisms like the paddle 120, FIG. 4C. In addition, a safety switch of conventional design, here shown as outline 154, operates to trigger with the opening of the lid 151 or any of the latches 152. Once triggered, the switch 154 disconnects all power to the motors, a procedure understood by those skilled in the art, such as the motor 110 of FIG. 4B. In this way, protection to individuals using the system is increased, perhaps preventing injury by moving parts or by the combination of electricity and water.

Appendix A contains, for disclosure purposes, examples, designs and dimensions of grease recovery sub-systems constructed in accord with the invention. By way of example, the sub-system 14 of FIG. 1 can reasonably be constructed in any of the configurations of pages A1–A4. Additional detail of a motor drive sub-system, such as the drive 110 of FIG. 4B, is also shown on pages A1–A4. Pages A5–A7 illustrate sample configurations of grease recovery systems, constructed according to the invention, and arranged in conjunction with waste water disposal networks and sewers.

There are several advantages of the invention. First, it simply recovers grease into a convenient collection chamber and provides gray water that is up to about 99% free of unwanted grease. Secondly, the invention requires little operating power and generates relatively little noise since the removal grease from waste water in a typical establishment can be accomplished within about five to ten minutes per day. Further, the invention operates to filter out solid particulates of virtually any dimension.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. A system for recovering grease from waste water, comprising:

basin means having a first inlet port to connect the system to a waste disposal network, a first outlet port for draining substantially grease-free water into a sewer network, and a grease outlet port for collecting grease from the system, the basin means holding waste water to a level corresponding to height of the outlet port above a floor of the basin means, the first inlet port being above the level so that incoming waste water drains into the basin means;

an inlet baffle, within the basin means and adjacent to the inlet port, for forcing waste water entering the inlet port downwards toward the floor, the inlet baffle forming an inlet conduit having a diameter that is approximately equal to the inlet port;

belt means, arranged for rotation within the basin means, for collecting grease along the water level, the belt means having a flexible belt that attracts grease and that lifts the grease upwards above the water level during rotation;

a first blocking baffle mounted to the floor between said inlet baffle and said belt, the first blocking baffle forming means for reducing waste water flow along the floor after the waste water passes through the inlet conduit, forcing grease towards the belt means and upwards to the water level downstream of the inlet baffle;

transport means for pushing grease along the water level and in a direction between the inlet port and the belt means; and grease transport means, connected to the basin means above the water level, having a catch trough for scraping grease off of the belt during rotation, the grease transport means transporting recovered grease out of the grease outlet port.

2. A system according to claim 1, further comprising strainer means for separating solid waste from the waste water.

3. A system according to claim 2, wherein the strainer means comprises a strainer mesh, the strainer mesh having a plurality of holes to pass water and grease therethrough, and to substantially prohibit solid waste from passing into the inlet port.

4. A system according to claim 3, wherein the mesh is formed into a box, and further comprising handle means to facilitate easy access and removal of the box to remove solid waste from the mesh.

5. A system according to claim 2, wherein the strainer means comprises an outer casing and an inner strainer box, the outer casing having a second inlet port for connecting the system to the waste disposal network, and a second outlet port for passing waste water to the inlet port.

6. A system according to claim 1, further comprising a sanitary tee within the basin means and adjacent to the outlet port, the sanitary tee forming an outlet conduit for waste water from the floor to the outlet port, the outlet conduit having a diameter that is approximately equal to the outlet port, the tee thereby blocking water-level waste water from the outlet port, and communicating floor-level waste water out of the outlet port.

7. A system according to claim 1, further comprising a sanitary tee within the basin means and adjacent to the outlet port, the tee having an tee inlet adjacent to the floor and forming a waste water conduit between the tee inlet and the outlet port, the waste water conduit having a diameter that is approximately equal to the outlet port, the waste water conduit being triangularly shaped, the sanitary tee thereby blocking water-level waste water from the outlet port, and communicating waste water through the tee inlet and out of the outlet port.

8. A system according to claim 7, further comprising a second blocking baffle mounted to the floor, the second blocking baffle being adjacent to the tee inlet and reducing waste water flow along the floor before the waste water passes through the tee inlet.

9. A system according to claim 8, further comprising feedback means having a pump and pipe means to collect waste water adjacent to the second blocking baffle and to communicate the collected waste water back to the inlet port, wherein waste water is recycled between the outlet port and inlet port to enhance cleaning of the waste water.

10. A system according to claim 1, further comprising a grease feedback subsystem comprising (i) a sanitary tee within the basin means and adjacent to the outlet port, the sanitary tee having an tee inlet adjacent to the floor and forming a waste water conduit between the tee inlet and the outlet port, (ii) a second blocking baffle mounted to the floor, the second blocking baffle reducing waste water flow along the floor before the waste water passes through the tee inlet, and (iii) pump means for collecting waste water adjacent to the second blocking baffle and for communicating the collected waste water back to the inlet port, wherein waste water is recycled between the outlet port and inlet port to enhance cleaning of the waste water.

11. A system according to claim 1, wherein the belt comprises material selected from the group of lock plastic and hard plastic.

12. A system according to claim 1, wherein the belt means comprises a first roller and a second roller, the first roller being out of the waste water and the second roller being within the waste water, the belt being arranged around the rollers to facilitate rotation within the waste water.

13. A system according to claim 12, wherein the first roller is about two inches in diameter, and wherein the second roller is about three inches in diameter.

14. A system according to claim 1, wherein the transport means comprises a blower for blowing air onto waste water at the water level, thereby increasing water flow along the water level and between the inlet baffle and the belt means.

15. A system according to claim 1, wherein the transport means comprises paddle means for rotating within the waste water, the paddle means having a paddle which dips at most one half inch below the water level during rotation, thereby increasing water flow along the water level and between the inlet baffle and the belt means.

16. A system according to claim 1, wherein the basin means is formed of polished stainless steel.

17. A system according to claim 1, wherein the inlet baffle and first blocking baffle are formed of polished stainless steel.

18. A system according to claim 1, wherein the belt means comprises a motor and drive element to rotate the belt, and further comprising safety cover means, the safety cover means having a cover to cover the basin means to prohibit direct access to within the basin means, and a safety switch, arranged to shut off the motor to stop the drive element when the cover is lifted.

* * * * *